(12) United States Patent
Bovero et al.

(10) Patent No.: US 11,861,822 B2
(45) Date of Patent: Jan. 2, 2024

(54) IMAGE RECOGNITION DEVICE AND METHOD FOR RETRIEVING INFORMATION ON A MARKER

(71) Applicant: Saudi Arabian Oil Company, Dhahran (SA)

(72) Inventors: Enrico Bovero, Vancouver (CA); Dana Abdullatif, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 231 days.

(21) Appl. No.: 17/304,698

(22) Filed: Jun. 24, 2021

(65) Prior Publication Data

US 2022/0414863 A1    Dec. 29, 2022

(51) Int. Cl.
| | | |
|---|---|---|
| G06K 19/06 | (2006.01) | |
| G06K 7/10 | (2006.01) | |
| G06K 7/00 | (2006.01) | |
| G06T 7/73 | (2017.01) | |
| G06V 10/22 | (2022.01) | |
| G06V 20/60 | (2022.01) | |
| G06T 7/00 | (2017.01) | |

(52) U.S. Cl.
CPC .............. G06T 7/0008 (2013.01); G06T 7/73 (2017.01); *G06T 2207/10116* (2013.01); *G06T 2207/30204* (2013.01)

(58) Field of Classification Search
None
See application file for complete search history.

(56) References Cited

U.S. PATENT DOCUMENTS

| 3,267,260 | A | 8/1966 | Baker et al. |
| 4,053,433 | A | 10/1977 | Lee |
| 5,491,637 | A | 2/1996 | Kraemer et al. |
| 8,903,473 | B2 * | 12/2014 | Rogers .................. A61B 90/39 600/431 |
| 11,553,969 | B1 * | 1/2023 | Lang .................. G02B 27/0172 |
| 2003/0019566 | A1 * | 1/2003 | Pate .................... B29C 66/8248 156/583.1 |
| 2004/0253105 | A1 | 12/2004 | Vaidyanathan |
| 2005/0026310 | A1 * | 2/2005 | Zhao ........................ H01L 22/34 257/E21.527 |
| 2011/0060365 | A1 * | 3/2011 | Felix .................. A61B 17/7011 606/264 |

(Continued)

FOREIGN PATENT DOCUMENTS

| WO | 1994002857 A1 | 2/1994 |
| WO | 0034937 A1 | 6/2000 |

OTHER PUBLICATIONS

Goodney, Andrew, "Lecture 1: Introduction to Computer Science." CSCI 109, Aug. 26, 2019. 52 pages.

*Primary Examiner* — Soo Shin
(74) *Attorney, Agent, or Firm* — Leason Ellis LLP

(57) ABSTRACT

An image recognition device and method retrieve information on a marker. The marker encodes information identifying an asset by encoding the information in a binary pattern as recesses and non-recesses in the marker. The image recognition is performed by imaging the marker, mapping contrast in the image, identifying variations in the contrast, creating a mesh overlaying the image, identifying the present or absence of recesses from the mesh, and reading the binary pattern represented by the recesses in the marker.

20 Claims, 4 Drawing Sheets

(56) References Cited

U.S. PATENT DOCUMENTS

| | | | |
|---|---|---|---|
| 2011/0172718 A1* | 7/2011 | Felix | A61B 17/866 |
| | | | 606/305 |
| 2014/0326507 A1 | 11/2014 | Spriggs | |
| 2019/0093828 A1 | 3/2019 | Bovero et al. | |
| 2020/0138518 A1* | 5/2020 | Lang | A61B 5/05 |
| 2020/0405395 A1* | 12/2020 | Gullotti | A61B 17/7082 |
| 2021/0197546 A1* | 7/2021 | Fisher | C09D 11/02 |
| 2021/0220625 A1* | 7/2021 | Byrne | A61M 25/104 |
| 2022/0414405 A1* | 12/2022 | Bovero | G05B 19/4155 |
| 2022/0414863 A1* | 12/2022 | Bovero | G06K 7/10722 |

* cited by examiner

IMAGE RECOGNITION DEVICE AND METHOD FOR RETRIEVING INFORMATION ON A MARKER

FIELD OF THE DISCLOSURE

The present disclosure relates generally to image recognition, and, more particularly, to an image recognition device and method for retrieving information on a marker.

BACKGROUND OF THE DISCLOSURE

Binary information has been encoded in holes on cards for over a century. One notable example is a card with holes used in Jacquard looms, which utilize such recesses to control the threading of fabric. Such holes can encode information to perform the control of the threading. The card in a Jacquard loom can be composed of metal for durability, and so such cards can be radiopaque by virtue of being metallic.

Other cards encoding information using holes are punch cards which can control computers. Using a hole punch device or other similar mechanisms, a programmer can selectively punch the holes into the card. In turn, readers are known for extracting the information encoded by the holes. Some readers utilize mechanical actuators which physically detect the presence or absence of holes in the card.

SUMMARY OF THE DISCLOSURE

According to an embodiment consistent with the present disclosure, an image recognition device and method retrieve information on a marker. The marker encodes information identifying an asset by encoding the information in a binary pattern as recesses and non-recesses in the marker.

In one embodiment, an image recognition device of the present disclosure comprises a camera, a processor, and a memory. The camera is configured to capture an image of a marker. The marker has recesses in at least a top surface of the marker in a field of view of the camera. The processor is configured to receive the image from the camera. The memory is accessible by the processor, with the memory configured to store a plurality of modules each comprising code executable by the processor. The plurality of modules comprises a contrast mapping module, a contrast variation identifying module, a mesh creation module, and a reading module. The contract mapping module is configured to map contrast in the image to generate a set of contrasts from the image. The contrast variation identifying module is configured to identify variations in the set of contrasts. The mesh creation module is responsive to the variations and is configured to create a mesh overlaying the image to locate the position of all possible recesses in the image to be in a transformed image. The reading module is configured to read, from the transformed image, a binary pattern represented by the recesses. The marker can be composed of a radiopaque material, and the camera captures an X-ray radiograph of the marker as the image. The recesses can be holes extending through the top surface and a bottom surface of the marker. The contrast is an optical contrast of optical features in the image. Alternatively, the contrast is a variation of a parameter to encode the binary pattern in the recesses of the marker.

The variations in the contrast are determined relative to a predetermined threshold. Alternatively, the variations in the contrast are determined relative to illumination of the marker during the image capturing by the camera. In a further alternative embodiment, the variations in the contrast are determined relative to exposure of the marker during the image capturing by the camera. The mesh has equally spaced lines. Alternatively, the mesh has irregularly spaced lines.

In another embodiment, a method of the present disclosure comprises capturing an image of a marker using a camera. The marker has recesses in at least a top surface in the field of view of the camera. The method further includes mapping contrast in the image, identifying variations in the contrast, and responsive to the variations in creating a mesh overlaying the image. The method then locates the position of recesses in the image, identifies the presence or absence of recesses in the image, and reads a binary pattern represented by the recesses.

The marker is composed of a radiopaque material, and the camera captures an X-ray radiograph of the marker as the image. The recesses can be holes extending through the top surface and a bottom surface of the marker. The contrast is an optical contrast of optical features in the image. Alternatively, the contrast is a variation of a parameter to encode the binary pattern in the recesses of the marker. The variations in the contrast are determined relative to a predetermined threshold. Alternatively, the variations in the contrast are determined relative to illumination of marker during the image capturing by the camera. In a further alternative embodiment, the variations in the contrast are determined relative to exposure of marker during the image capturing by the camera. The mesh has equally spaced lines. Alternatively, the mesh has irregularly spaced lines.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to an image recognition device and method which retrieve information on a marker by imaging recesses on the marker.

Figure 1:
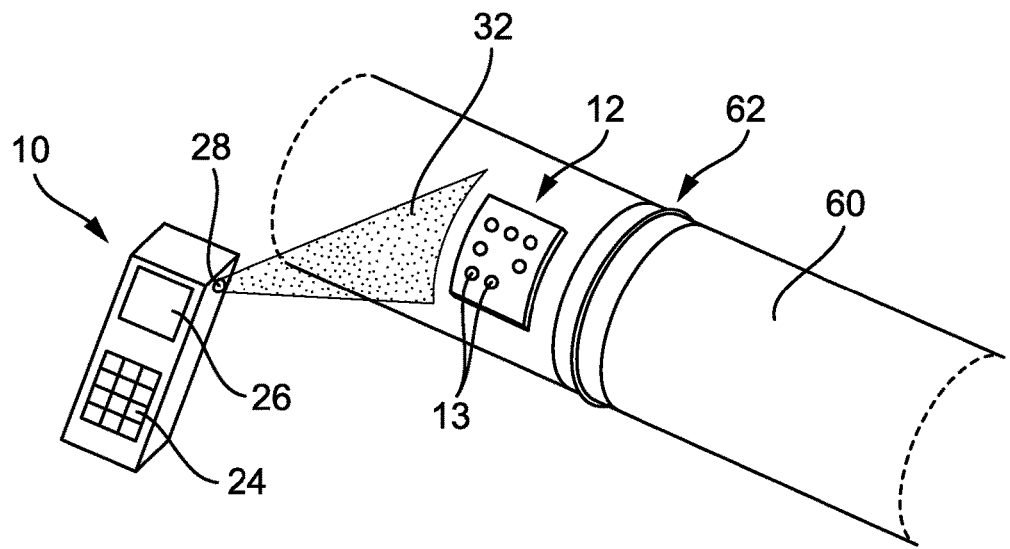
FIG. 1 illustrates an image recognition device scanning a binary punch marker, according to an embodiment.
Figure 3:
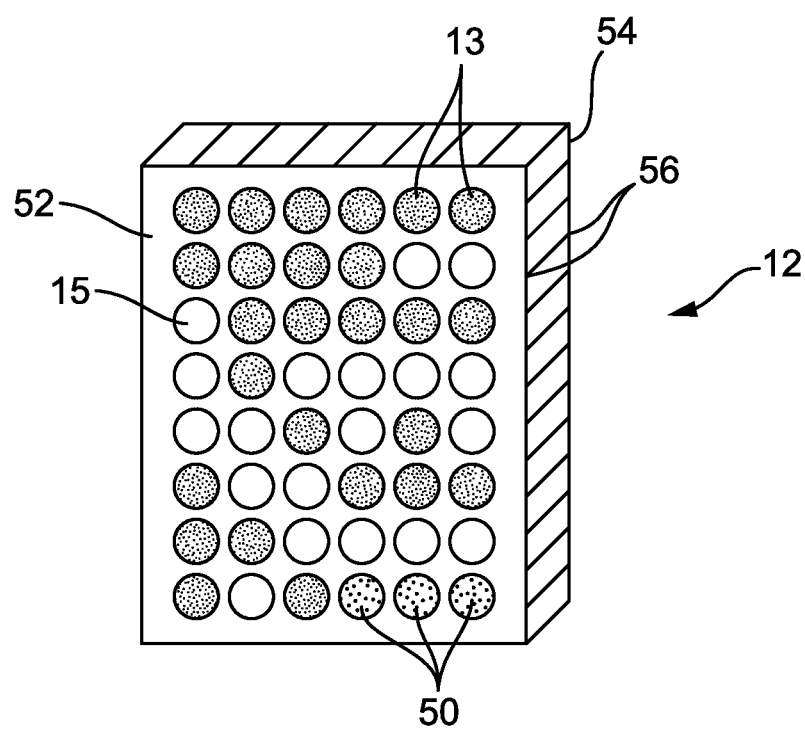
FIG. 3 is a top front side view of the binary punch marker.

According to an embodiment shown in FIG. 1, an image recognition device 10 captures and processes an image of a marker 12 having recesses 13 and non-recesses 15, as shown in FIGS. 1 and 3. The marker 12 can be fastened to an asset such as a pipe 60. Other examples of assets include pipe-lines, storage tanks, etc. The marker 12 can be fastened adjacent to a weld joint or seam 62 of the pipe 60. As used herein, the term "joint" refers to a joining of two pipe members to create an overall pipe. The image recognition device 10 captures the image of the marker 12 with recesses 13 within a field of view (FOV) 32 of a camera 28 of the device 10. By capturing and processing the image, the device 10 extracts information identifying the weld seam 62.

The recesses 13 and non-recesses 15 encode the information identifying the weld seam 62. Alternatively, the information identifies the asset itself. The information can be a binary pattern which encodes the information. In certain embodiments, the binary pattern can be further encrypted. In a particular implementation consistent with this aspect of the disclosure, the further encryption is performed using an obfuscation procedure. The obfuscation procedure can be a hash function, for example, using a hash table. As will be understood by those of skill in the art, when further obfuscation is to be used, a different encryption process can be employed, including any known operation on the information to obfuscate it.

Figure 2:
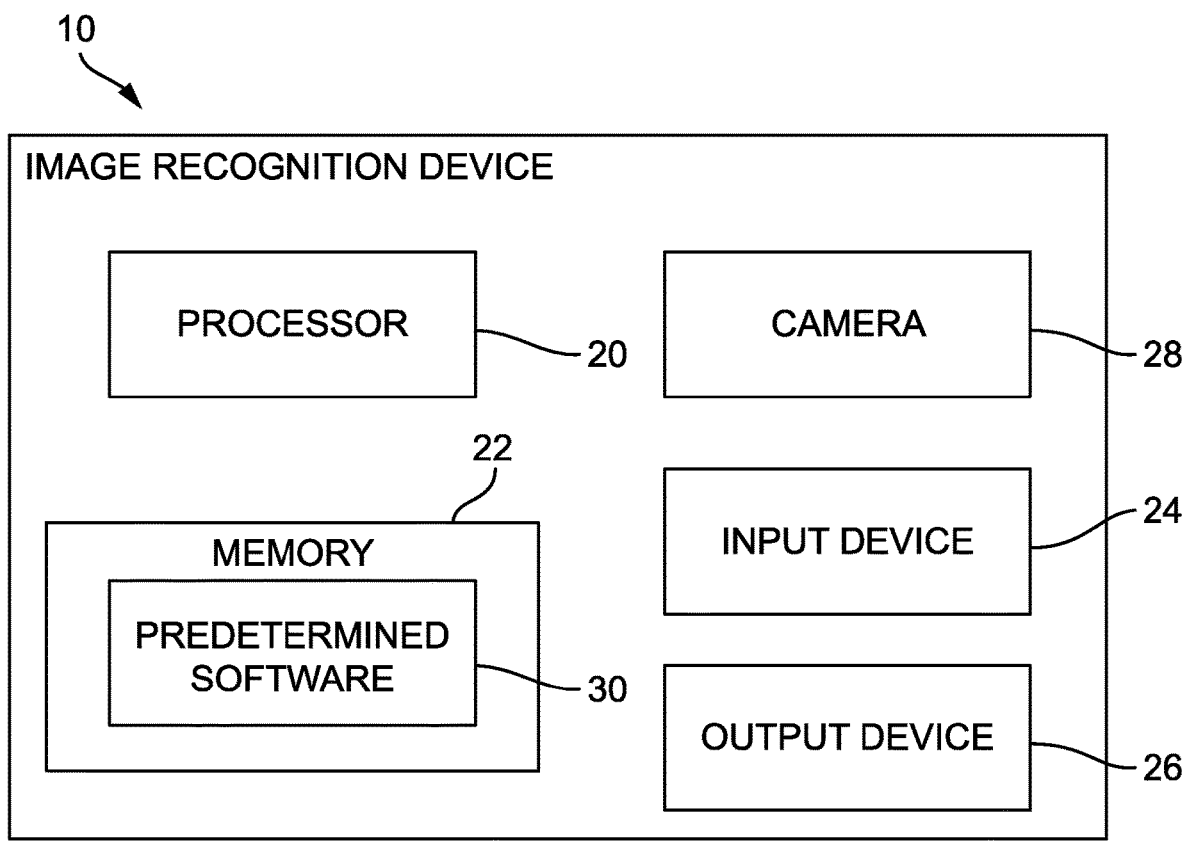
FIG. 2 is a schematic diagram of the image recognition device of FIG. 1.

Referring to FIGS. 1-2, the image recognition device 10 includes a processor 20, a memory 22, an input device 24, an output device 26, and the camera 28. The memory 22 is accessible by the processor 20. The memory 22 can store predetermined software 30 including a plurality of modules each comprising code which is executed by the processor 20 to operate the image recognition device 10. The predetermined software 30 can be composed of at least one module configured to perform a specific function, as described below. The input device 24 can include a keyboard, a keypad, a mouse, a touchscreen, or combinations thereof. The output device 26 can include a display. The display can be incorporated into a touchscreen. The input device 24 and the output device 26 can implement a graphic user interface. The image recognition device 10 can be implemented in any computing device, such as a handheld device. For example, the image recognition device 10 can be implemented in a smartphone, and the predetermined software 30 can be an app. Alternatively, the image recognition device 10 can be a tablet or a desktop personal computer (PC) running an application implementing the predetermined software 30.

Referring to FIG. 3, the recesses 13 can extend through at least a top surface 52 of the substrate of the marker 12. Alternatively, the recesses 13 are holes which extend through both the top surface 52 and a bottom surface 54. The substrate can be composed of a radiopaque material, including metal such as lead. Accordingly, the camera 28 can include a radiographic imager, such as an X-ray camera. By using a radiopaque material, the marker 12 can be used during inspection of pipes and welds at joints employing radiography such as X-rays, since the marker 12 will scatter X-rays. Alternatively, the camera 28 can be an optical camera operating using visible light to capture an image of the recesses 13 and non-recesses 15 in visible light wavelengths.

The binary punch marker 12 can be generally cuboidal in shape with a rectangular cross-section as shown in FIG. 3. It is understood that the marker 12 can have any other shape. It is also understood that the marker 12 can have any other cross-section such as a circular cross-section. The recesses 13 can be circular or any shape, such as a polygon. The marker 12 has a thickness 56, as shown in FIG. 3. The thickness 56 can be adjusted to the thickness of the asset, such as the underlying pipe to which the marker 12 is attached. The adjustment of the thickness 56 can provide sufficient contrast of the recesses 13 relative to the asset. For example, the thickness 56 can be less than 1 mm and having sufficient contrast. Such a thickness 56 has recesses 13 with sufficient contrast even with the marker 12 placed on top of several centimeters of steel.

Figure 4:
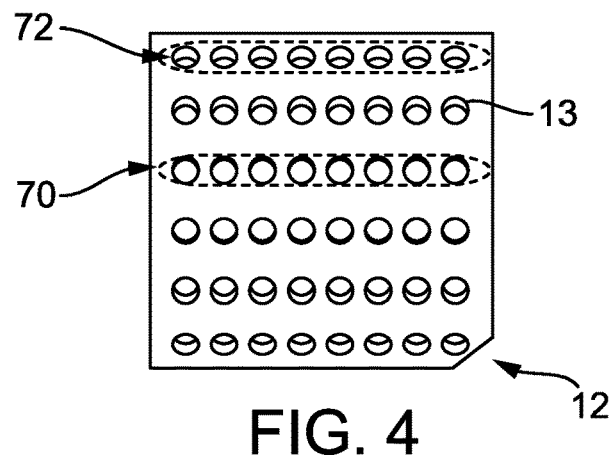
FIG. 4 illustrates deformation of the marker and its recesses.
Figure 5:
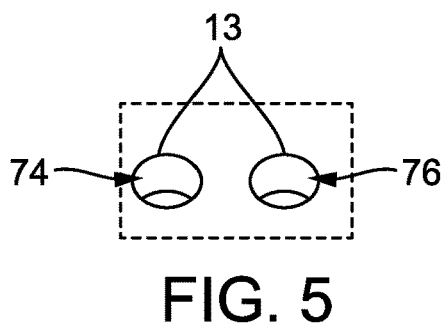
FIG. 5 illustrates occlusion of recesses.

When the marker 12 is placed on the curved surface, such as the surface of the pipe 60, the marker 12 can deform to complement a general curved shape of the surface, since the marker 12 is composed of metal such as lead. Accordingly, as shown in FIG. 4, although a first set 70 of recesses 13 can remain substantially circular, a second set 72 of recesses 13 can deform to not be fully circular. In addition, the camera 28 views the set 70 of recesses 13 substantially straight on with no angular displacement. However, due to the complementing of the marker 12 to the curved shape of the surface, the camera 28 views the set 72 of recesses 13 at an angle, and so the set 72 of recesses 13 do not appear fully circular. Accordingly, as shown in FIGS. 4-5, the recess 13 appears to the camera 28 as a narrow recess 74 with partial occlusion 76.

Figure 6:
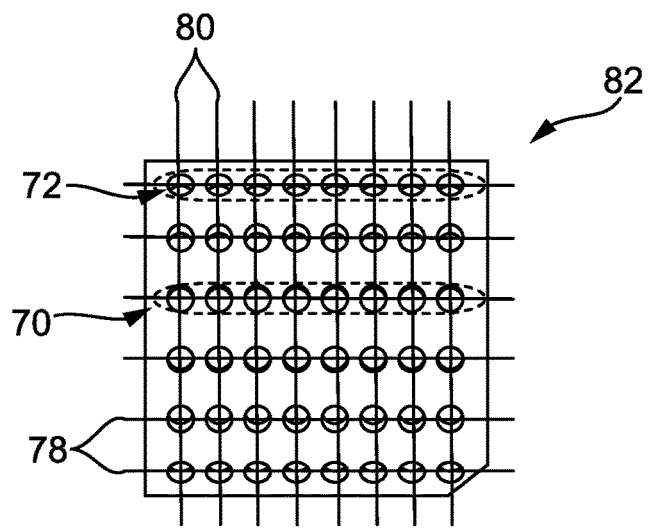
FIG. 6 illustrates overlaying of a mesh to determine the presence or absence of recesses.

When processing the image of the recesses 13 and non-recesses 15 in a marker 12, the image recognition device 10 overlays horizontal lines 78 and vertical lines 80 to form a mesh 82, as shown in FIG. 6. Using the mesh 82, the locations of the recesses 13 and the non-recesses 15 can be determined.

Figure 7:
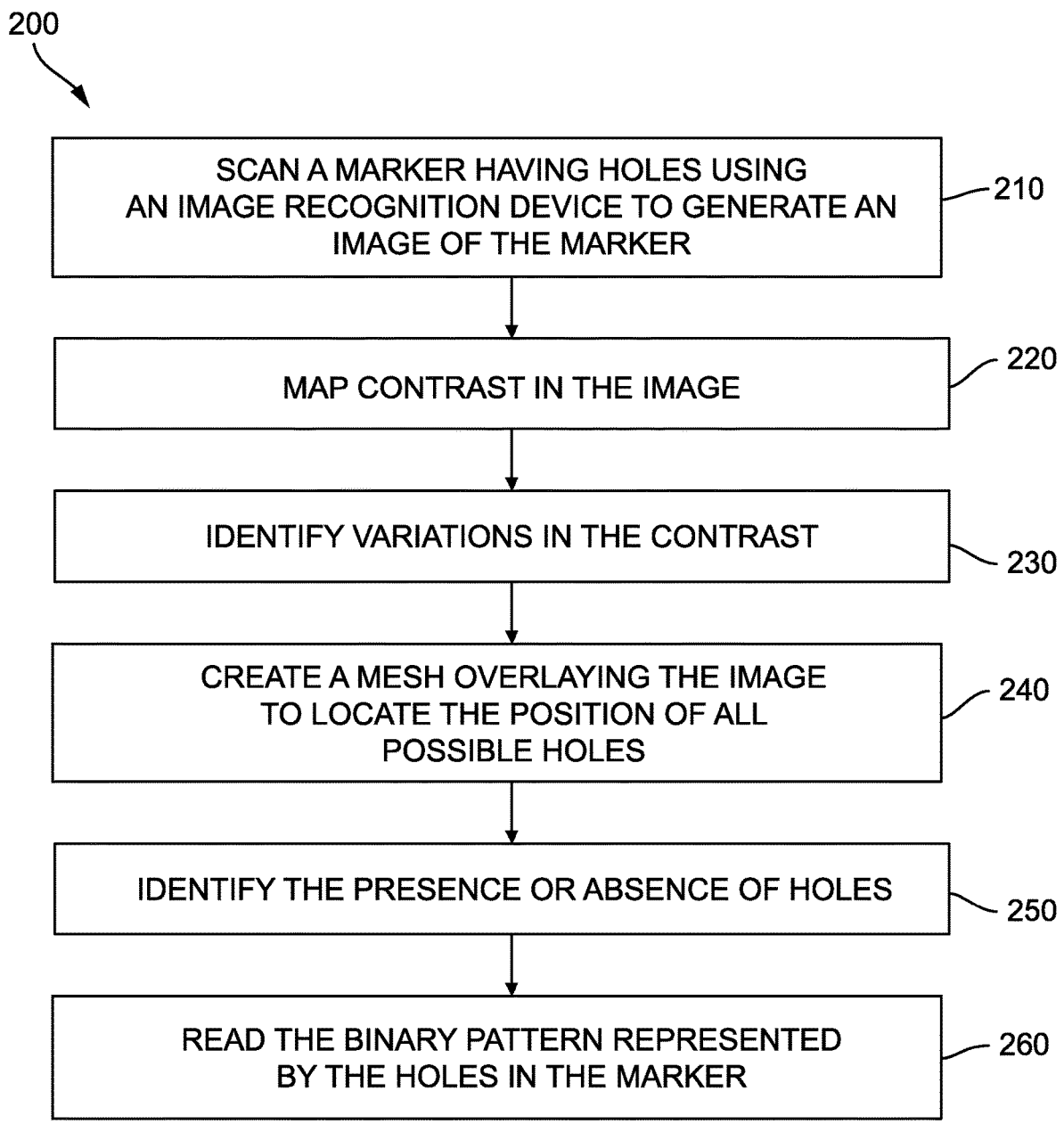
FIG. 7 is a flowchart of an image recognition method, according to the embodiment.

As shown in FIG. 7, a method 200 is performed for image recognition of information stored by recesses 13 and non-recesses 15 of a marker 12. The method 200 includes the step 210 of scanning the marker 12 having the recesses 13 and non-recesses 15 using the image recognition device 10. The device 10 then generates an image of the marker 12. For example, the image recognition device 10 includes the camera 28. The camera 28 can be a radiographic camera configured to capture an image, for example, using X-rays. Alternatively, the camera 28 can be an optical camera configured to capture an image, for example, using light in visible wavelengths.

The method 200 also includes the step 220 of mapping contrast in the image using a contrast mapping module to generate a set of contrasts from the image. The contrast can be an optical contrast of optical features in the image. Alternatively, the contrast is a variation of a parameter used to encode the information identifying the weld seam 62 as the recesses 13 and non-recesses 15 in the marker 12.

The method 200 further includes the step 230 of identifying variations in the contrast using a contrast variation identifying module to identify variations in the set of contrasts. The variations in the contrast can be determined relative to a predetermined threshold. Alternatively, the variations in the contrast can be determined relative to illumination of the marker during the image capturing by the camera 28. In a further embodiment, the variations in the contrast can be determined relative to exposure of marker during the image capturing by the camera 28.

In addition, the method 200 includes the step 240 of creating a mesh 82 using a mesh creation module. The mesh creation module responds to the variations in the contrast to determine at least one recess 13. Using the at least one recess 13, the mesh creation module is configured to create the mesh 82. The mesh 82 overlays the image to locate the position of all possible recesses 13 in the marker 12. The mesh 82 can have equally spaced lines. Alternatively, due to deformation of the marker 12 as described above, the mesh 82 can have lines spaced at irregular intervals. For example, referring to FIG. 6, the mesh line through the set 72 of recesses may be closer to a nearby mesh line than such mesh lines through and near the set 70 of recesses.

The method 200 also includes the step 250 of identifying the presence or absence of recesses 13 using a recess identifying module. The recess identifying module determines where in the mesh that recesses 13 are expected to be. For example, the recess identifying module can measure the contrast along each of the lines 78, 80 in FIG. 6. In one embodiment, if the contrast is greater than a predetermined threshold, the recess identifying module determines that a recess 13 is present, as in FIG. 3. Otherwise, the recess identifying module determines that a non-recess 15 is present, as in FIG. 3. The recess identifying module then creates a transformed image with determined recesses 13 and non-recesses 15.

The method 200 further includes the step 260 of reading, from the transformed image, the binary pattern of the identifying information represented by the recesses 13 and non-recesses 15 in the marker 12 using a reading module. The reading module decodes the binary pattern of the recesses 13 and non-recesses 15 to extract the information identifying the weld seam 62. The reading module can also decrypt the binary pattern if such identifying information has been encrypted. For example, the decryption can be a reverse hash function matching the original hash function. In one embodiment, the reverse hash function can use the original hash table to reverse the original hash function. Alternatively, the decryption can match the encryption process used to encrypt the identifying information.

Portions of the methods described herein can be performed by software or firmware in machine readable form on a tangible (e.g., non-transitory) storage medium. For example, the software or firmware can be in the form of a computer program including computer program code adapted to cause the fabrication system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An image recognition device comprising:
   a camera configured to capture an image of a marker having recesses in at least a top surface of the marker in a field of view of the camera, wherein the camera is selected from the group consisting of: an optical camera and an X-ray camera;
   a processor configured to receive the image from the camera; and
   a memory accessible by the processor, with the memory configured to store a plurality of modules each comprising code executable by the processor, the plurality of modules comprising:
      a contrast mapping module configured to map contrast in the image to generate a set of contrasts from the image;
      a contrast variation identifying module configured to identify variations in the set of contrasts;
      a mesh creation module responsive to the variations and configured to create a mesh overlaying the image to locate the position of all possible recesses in the image to be in a transformed image; and
      a reading module configured to read, from the transformed image, a binary pattern represented by the recesses.

2. The image recognition device of claim 1, wherein the marker is composed of a radiopaque material, and wherein the camera captures an X-ray radiograph of the marker as the image.

3. The image recognition device of claim 1, wherein the recesses are holes extending through the top surface and a bottom surface of the marker.

4. The image recognition device of claim 1, wherein the contrast is an optical contrast of optical features in the image.

5. The image recognition device of claim 1, wherein the contrast is a variation of a parameter to encode the binary pattern in the recesses in the marker.

6. The image recognition device of claim 1, wherein the variations in the contrast are determined relative to a predetermined threshold.

7. The image recognition device of claim 1, wherein the variations in the contrast are determined relative to illumination of the marker during the image capturing by the camera.

8. The image recognition device of claim 1, wherein the variations in the contrast are determined relative to exposure of the marker during the image capturing by the camera.

9. The image recognition device of claim 1, wherein the mesh has equally spaced lines.

10. The image recognition device of claim 1, wherein the mesh has irregularly spaced lines.

11. A method comprising:
capturing an image of a marker using a camera, the marker having recesses in at least a top surface in the field of view of the camera, wherein the camera is selected from the group consisting of: an optical camera and an X-ray camera;
mapping contrast in the image;
identifying variations in the contrast;
responsive to the variations, creating a mesh overlaying the image;
locating the position of recesses in the image;
identifying the presence or absence of recesses in the image; and
reading a binary pattern represented by the recesses.

12. The method of claim 11, wherein the marker is composed of a radiopaque material, and
wherein the camera captures an X-ray radiograph of the marker as the image.

13. The method of claim 11, wherein the recesses are holes extending through the top surface and a bottom surface of the marker.

14. The method of claim 11, wherein the contrast is an optical contrast of optical features in the image.

15. The method of claim 11, wherein the contrast is a variation of a parameter to encode the binary pattern in the recesses of the marker.

16. The method of claim 11, wherein the variations in the contrast are determined relative to a predetermined threshold.

17. The method of claim 11, wherein the variations in the contrast are determined relative to illumination of marker during the image capturing by the camera.

18. The method of claim 11, wherein the variations in the contrast are determined relative to exposure of marker during the image capturing by the camera.

19. The method of claim 11, wherein the mesh has equally spaced lines.

20. The method of claim 11, wherein the mesh has irregularly spaced lines.

* * * * *